(12) United States Patent
Imai

(10) Patent No.: US 10,037,049 B2
(45) Date of Patent: Jul. 31, 2018

(54) MANAGEMENT SYSTEM THAT PERFORMS PROCESSING FOR SYNCHRONIZING SETTING DATA, ALTERNATIVE MANAGEMENT APPARATUS, MANAGEMENT METHOD, AND STORAGE MEDIUM

(71) Applicant: CANON KABUSHIKI KAISHA, Tokyo (JP)

(72) Inventor: Yasuhiro Imai, Noda (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/439,011

(22) Filed: Feb. 22, 2017

(65) Prior Publication Data
US 2017/0248988 A1  Aug. 31, 2017

(30) Foreign Application Priority Data
Feb. 29, 2016  (JP) .................. 2016-037030

(51) Int. Cl.
*G06F 3/12* (2006.01)
*G06F 1/12* (2006.01)

(52) U.S. Cl.
CPC ...................... *G06F 1/12* (2013.01)

(58) Field of Classification Search
None
See application file for complete search history.

(56) References Cited

U.S. PATENT DOCUMENTS

2016/0028913 A1*  1/2016  Yoshida ............. H04N 1/00933
358/1.15

FOREIGN PATENT DOCUMENTS

| JP | H05250281 A | 9/1993 |
| JP | 2003108539 A | 4/2003 |

* cited by examiner

*Primary Examiner* — Henok A Shiferaw
(74) *Attorney, Agent, or Firm* — Rossi, Kimms & McDowell LLP

(57) ABSTRACT

A management system capable of preventing a problem from occurring in synchronizing setting data. The setting data is managed by a server, and is alternatively managed by an MFP as an alternative server. The server keeps a first time. The MFP keeps a second time. The MFP corrects the second time using a difference between the first time and the second time. The MFP manages the setting data based on the corrected second time.

5 Claims, 9 Drawing Sheets

FIG. 6

| ATTRIBUTE | VALUE |
|---|---|
| INDIVIDUAL IDENTIFIER | INDIVIDUAL 1 |
| MODEL NAME | MODEL A |
| FIRM VERSION | 0.01 |
| INSTALLED LICENSE | COPY-FORGERY-INHIBITED PATTERN LICENSE |
| ACCESSORY | Finisher-X |
| CORRECTION TIME | -1 HOUR |

FIG. 7

| USER ID | USER NAME | FIRST NAME | LAST NAME |
|---|---|---|---|
| 501 | sato | TAKASHI | SATOU |
| 502 | ii | RYOUKO | II |

FIG. 8

| USER ID | KEY IDENTIFIER | VALUE | DATE AND TIME OF CHANGE | DATE AND TIME OF UPDATE |
|---|---|---|---|---|
| 501 | preference.print_setting1 | {colormode:"BW", copies:"3"} | 2014/2/4/ 2:01 | 2014/2/4/ 2:02 |
| 501 | preference.print_setting2 | {colormode:"CL", quality:"3"} | 2014/2/3/ 7:35 | 2014/2/3/ 7:36 |
| 501 | preference.address1 | {destination: "sato@canon.com"} | 2014/8/30/ 3:01 | 2014/8/30/ 3:02 |
| 501 | preference.address2 | {destination: "user1@canon.com"} | 2014/1/13/ 2:16 | 2014/1/13/ 2:17 |

| USER ID | KEY IDENTIFIER | VALUE |
|---------|----------------|-------|
| 501 | preference.print_setting 1 | {colormode: "BW", copies: "3"} |
| 501 | preference.print_setting 2 | {colormode: "CL", quality: "3"} |
| 501 | preference.address 1 | {destination: "sato@canon.com"} |
| 501 | preference.address 2 | {destination: "user1@canon.com"} |

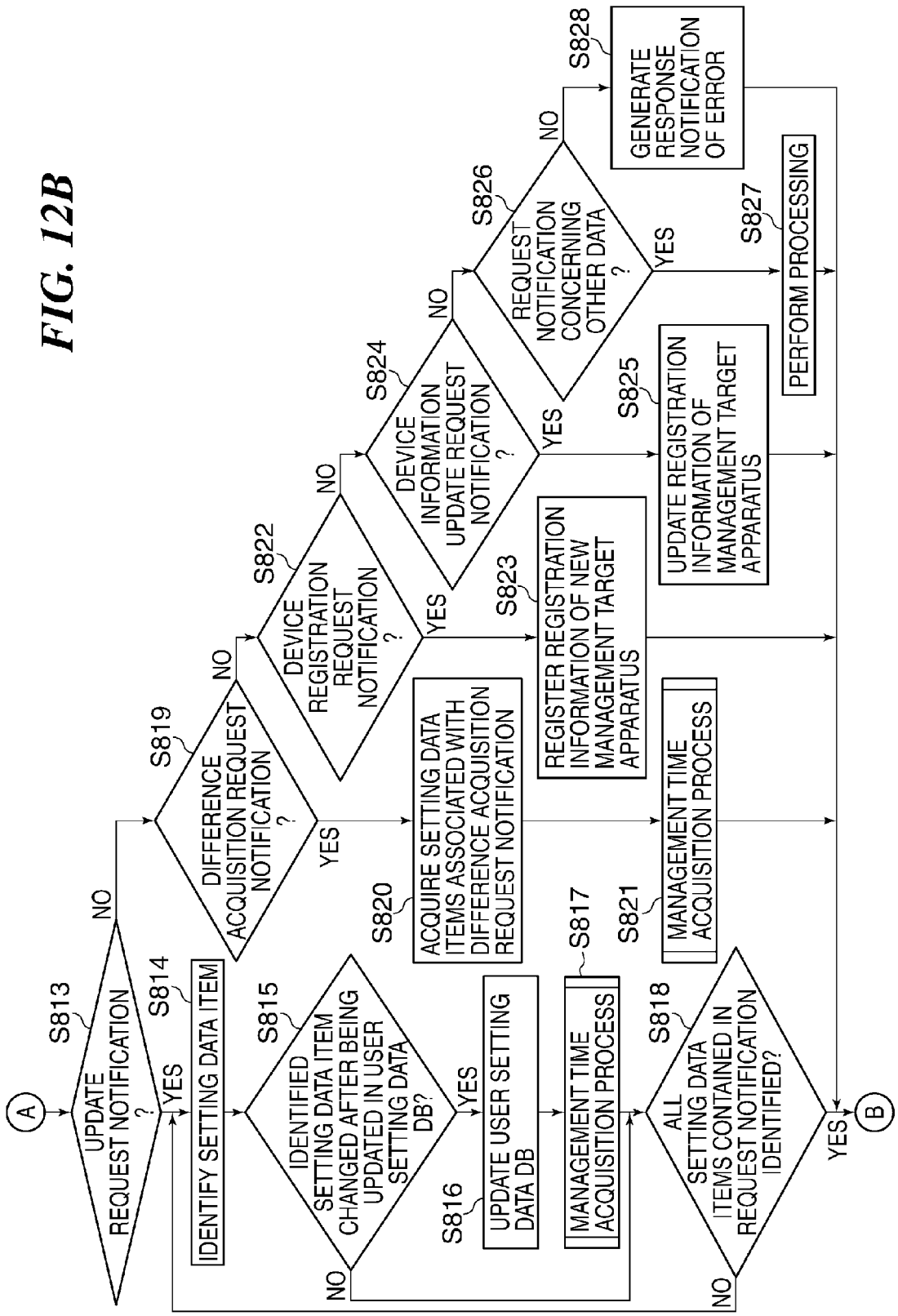

MANAGEMENT SYSTEM THAT PERFORMS PROCESSING FOR SYNCHRONIZING SETTING DATA, ALTERNATIVE MANAGEMENT APPARATUS, MANAGEMENT METHOD, AND STORAGE MEDIUM

BACKGROUND OF THE INVENTION

Field of the Invention

The present invention relates to a management system that performs processing for synchronizing setting data, an alternative management apparatus, a management method, and a storage medium.

Description of the Related Art

There has been known a management system that causes the clock time to match between a server and a client apparatus (see e.g. Japanese Patent Laid-Open Publication No. 2003-108539). In the management system, the client apparatus acquires a time kept by a server (hereinafter referred to as the "server time") at the startup of the client apparatus, and stores a time difference between a time kept by the client apparatus (hereinafter referred to as the "client time") and the server time. With this, in the management system, it is possible to easily achieve a match between the client time and the server time by adding the stored time difference to the client time, while eliminating the need for the client apparatus to always acquire the server time from the server. In the management system, for example, processing for synchronizing setting data of the client apparatus managed by the server is performed using the clock time thus matched between them.

Further, in Japanese Patent Laid-Open Publication No. H05-250281, there has been disclosed a time-keeping apparatus that notifies time information to a plurality of client apparatuses. The time-keeping apparatus serving as a master notifies time information to the client apparatuses, and in case where an abnormality arises in the time-keeping apparatus serving as the master, it is possible to switch the master time-keeping apparatus to a time-keeping apparatus that has been copying the time information.

However, in a case where an abnormality arises in the server disclosed in Japanese Patent Laid-Open Publication No. 2003-108539, there is a possibility that if the server is switched to an alternative server as described in Japanese Patent Laid-Open Publication No. H05-250281, it is impossible to maintain a match in time between the alternative server and clients.

For example, in a case where a time kept by the alternative server (hereinafter referred to as the "alternative server time") does not match the server time, it is impossible to achieve a match between the client time and the alternative server time in spite of making use of the time difference between the client time and the server time. This causes a problem in processing for synchronizing setting data between the client apparatus and the alternative server.

SUMMARY OF THE INVENTION

The present invention provides a management system that is capable of preventing a problem from occurring in synchronizing setting data, an alternative management apparatus, a management method, and a storage medium.

In a first aspect of the invention, there is provided a management system including an alternative management apparatus that alternatively manages setting data managed by a management apparatus, comprising at least one processor and at least one memory coupled to the at least one processor which act as a correction unit configured to correct a second time using a difference between a first time kept by the management apparatus and the second time kept by the alternative management apparatus, and a management unit configured to manage the setting data based on the corrected second time.

In a second aspect of the invention, there is provided an alternative management apparatus that alternatively manages setting data managed by a management apparatus, comprising at least one processor and at least one memory coupled to the at least one processor which act as a correction unit configured to correct a second time using a difference between a first time kept by the management apparatus and the second time kept by the alternative management apparatus, and a management unit configured to manage the setting data based on the corrected second time.

In a third aspect of the invention, there is provided a method of managing setting data, which is executed by an alternative management apparatus that alternatively manages the setting data managed by a management apparatus, comprising correcting a second time using a difference between a first time kept by the management apparatus and the second time kept by the alternative management apparatus, and managing the setting data based on the corrected second time.

In a fourth aspect of the invention, there is provided a non-transitory computer-readable storage medium storing a computer-executable program for executing a method of managing setting data, which is executed by an alternative management apparatus that alternatively manages the setting data managed by a management apparatus, wherein the method comprises correcting a second time using a difference between a first time kept by the management apparatus and the second time kept by the alternative management apparatus, and managing the setting data based on the corrected second time.

According to the invention, it is possible to prevent a problem from occurring in synchronizing setting data between a server and a client.

Further features of the present invention will become apparent from the following description of exemplary embodiments (with reference to the attached drawings).

BRIEF DESCRIPTION OF THE DRAWINGS

FIG. 6 is a diagram of an example of contents of device information.

FIG. 7 is a diagram of an example of contents of user information.

FIG. 8 is a diagram of an example of contents of user-set data.

FIG. 12B is a continuation of FIG. 12A.

DESCRIPTION OF THE EMBODIMENTS

The present invention will now be described in detail below with reference to the accompanying drawings showing embodiments thereof.

Figure 1:
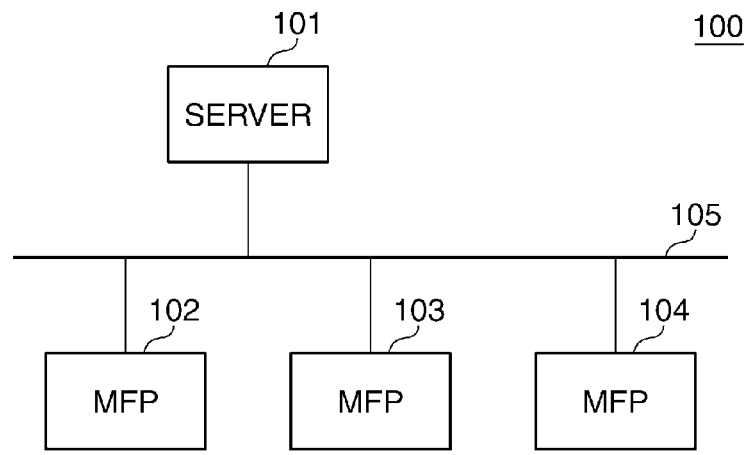
FIG. 1 is a schematic block diagram of a management system according to an embodiment of the present invention.

FIG. 1 is a schematic block diagram of a management system 100 according to an embodiment of the present invention.

Referring to FIG. 1, the management system 100 includes a server 101 as a management apparatus and MFPs 102 to 104. The server 101 and the MFPs 102 to 104 are connected to each other via a network 105.

The server 101 has server authority over the management system 100, and manages respective setting data of the MFPs 102 to 104 registered as management target apparatuses. For example, when the MFP 103 transmits an update request notification for requesting update of setting data changed by the MFP 103 to the server 101, the server 101 updates setting data corresponding to the update request notification. At this time, the server 101 records the update date and time of the setting data as update date and time information of the setting data. As the update date and time information of the setting data, a server time is recorded which is kept by the server 101 at the update time of the setting data. That is, the update date and time information of the setting data is managed using the server time. Further, the server 101 selects a backup destination from the registered management target apparatuses, and periodically backs up the setting data and the update date and time information of the setting data in the backup destination. The MFPs 102 to 104 are capable of executing jobs, such as copy processing and scan processing, and stores setting data items.

Figure 2:
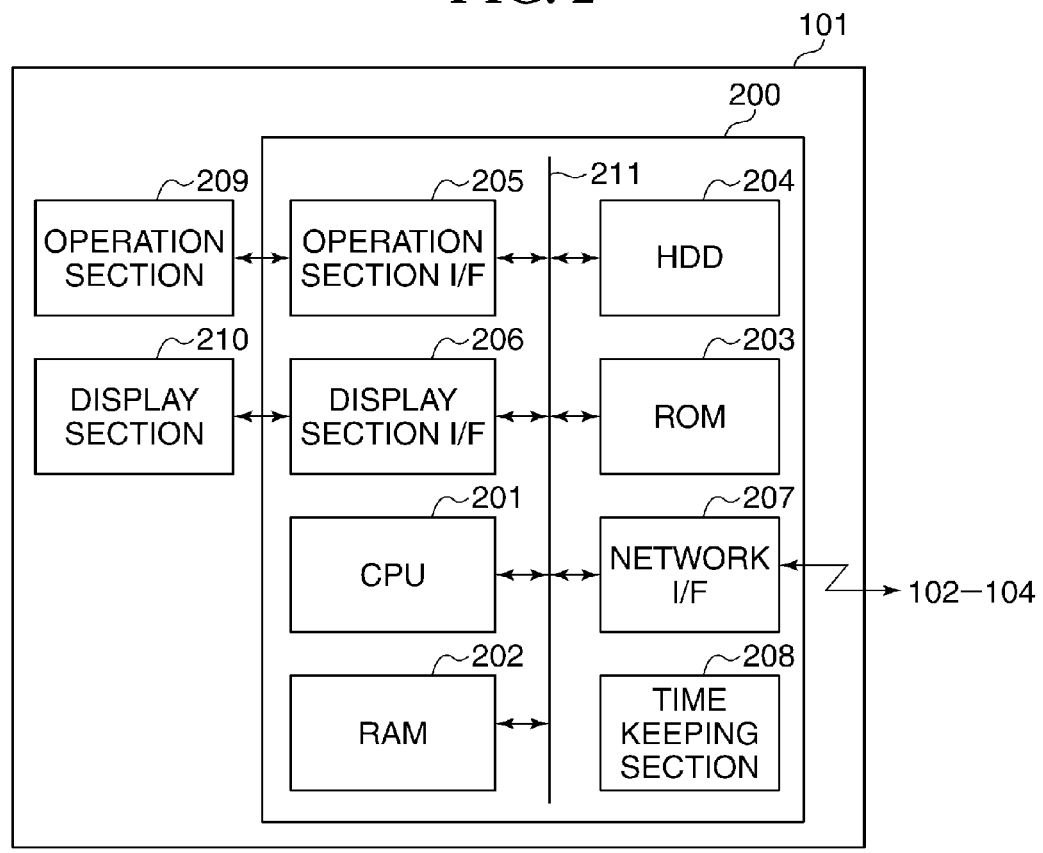
FIG. 2 is a schematic block diagram showing a hardware configuration of a server appearing in FIG. 1.

FIG. 2 is a schematic block diagram showing a hardware configuration of the server 101 appearing in FIG. 1.

Referring to FIG. 2, the server 101 is comprised of a controller 200, an operation section 209, and a display section 210, and the controller 200 is connected to the operation section 209 and the display section 210. The controller 200 includes a CPU 201, a RAM 202, a ROM 203, an HDD 204, an operation section interface 205, a display section interface 206, a network interface 207, and a time keeping section 208. The components of the CPU 201, the RAM 202, the ROM 203, the HDD 204, the operation section interface 205, the display section interface 206, the network interface 207, and the time keeping section 208 are connected to each other via a system bus 211.

The controller 200 controls the overall operation of the server 101. The CPU 201 performs each of various kinds of processing of software modules 400, described hereinafter with reference to FIG. 4, by executing programs stored in the ROM 203 or the HDD 204. This causes the CPU 201 to control the components connected to the system bus 211. The RAM 202 is used as a work area for the CPU 201, and is also used as an area for temporarily storing various data. The ROM 203 stores various data, programs, and so forth.

The HDD 204 stores master data 500, described hereinafter with reference to FIG. 5, which includes the setting data items of the MFPs 102 to 104, and the update date and time information of the setting data items, and so forth. The operation section interface 205 performs data communication with the operation section 209, and the display section interface 206 performs data communication with the display section 210. The network interface 207 performs data communication with the MFPs 102 to 104 connected to the network 105. The time keeping section 208 checks and stores time points at which the setting data items included in the master data 500, described hereinafter, are updated, and the like. The operation section 209 is a keyboard, for example, and receives information input by a user's keyboard operation. The display section 210 displays images.

Next, a description will be given of the hardware configuration of the MFPs 102 to 104. Note that in the present embodiment, the MFPs 102 to 104 have the same configuration, and hence the configuration of the MFP will be described using the MFP 102 by way of example.

Figure 3:
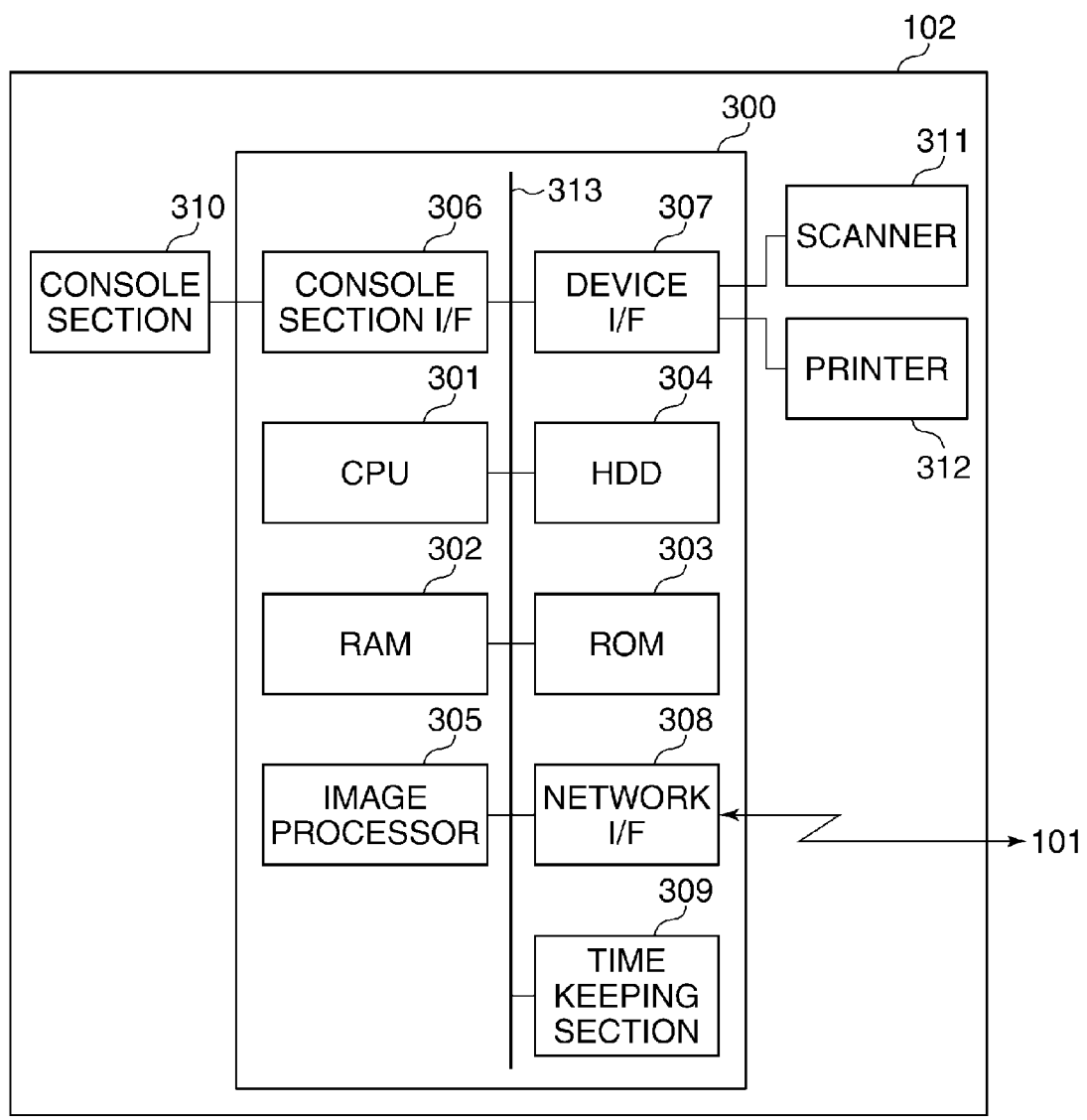
FIG. 3 is a schematic block diagram showing a hardware configuration of an MFP appearing in FIG. 1.

FIG. 3 is a schematic block diagram showing the hardware configuration of the MFP 102 appearing in FIG. 1.

Referring to FIG. 3, the MFP 102 is comprised of a controller 300, a console section 310, a scanner 311, and a printer 312, and the controller 300 is connected to the console section 310, the scanner 311, and the printer 312. The controller 300 includes a CPU 301, a RAM 302, a ROM 303, an HDD 304, an image processor 305, a console section interface 306, a device interface 307, a network interface 308, and a time keeping section 309. The components of the CPU 301, the RAM 302, the ROM 303, the HDD 304, the image processor 305, the console section interface 306, the device interface 307, the network interface 308, and the time keeping section 309 are connected to each other via a system bus 313.

The controller 300 performs centralized control over the MFP 102. The CPU 301 performs each of various kinds of processing of software modules 600, described hereinafter with reference to FIG. 9, by executing programs stored in the ROM 303 or the HDD 304. This causes the CPU 301 to control the components connected to the system bus 313. The RAM 302 is used as a work area for the CPU 301, and is also used as an area for temporarily storing various data. The ROM 303 stores various data and programs. The HDD 304 stores a setting data database (DB), described hereinafter, which contains the setting data items of the MFP 102. In a case where the MFP 102 is set as a backup destination of the server 101, the HDD 304 stores the master data 500, described hereinafter, transmitted from the server 101. The image processor 305 performs various image processing, such as image rotation, image compression, resolution conversion, color space conversion, and gradation conversion, on image data generated by the scanner 311. The console section interface 306 performs data communication with the console section 310, and the device interface 307 performs data communication with the scanner 311 and the printer 312. The network interface 308 performs data communication with the server 101 connected via the network 105. The time keeping section 309 checks and stores e.g. time points at which the setting data items included in the setting data database are changed. The console section 310 includes operation keys (not shown), and receives information input by a user's operation of each operation key. The scanner 311 reads an original placed on an original platen glass (not shown), and generates image data. The printer 312 performs print processing based on the image data generated by the scanner 311, or the like.

Figure 4:
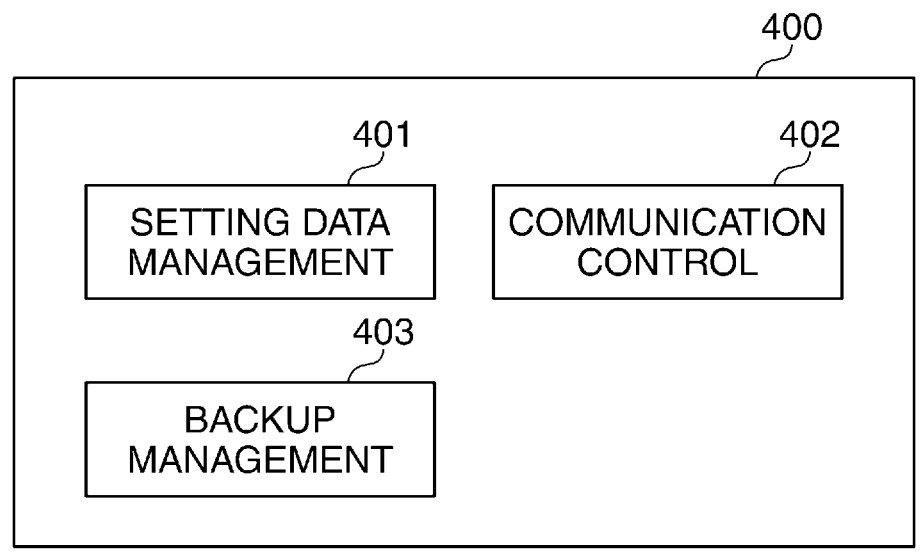
FIG. 4 is a schematic block diagram of software modules of the server in FIG. 1.

FIG. 4 is a schematic block diagram of the software modules 400 of the server 101 appearing in FIG. 1.

Referring to FIG. 4, the software modules 400 include a setting data management module 401, a communication control module 402, and a backup management module 403. Various processes of the software modules 400 are performed by the CPU 201 of the server 101 which executes programs stored in the ROM 203 or the HDD 204.

Figure 5:
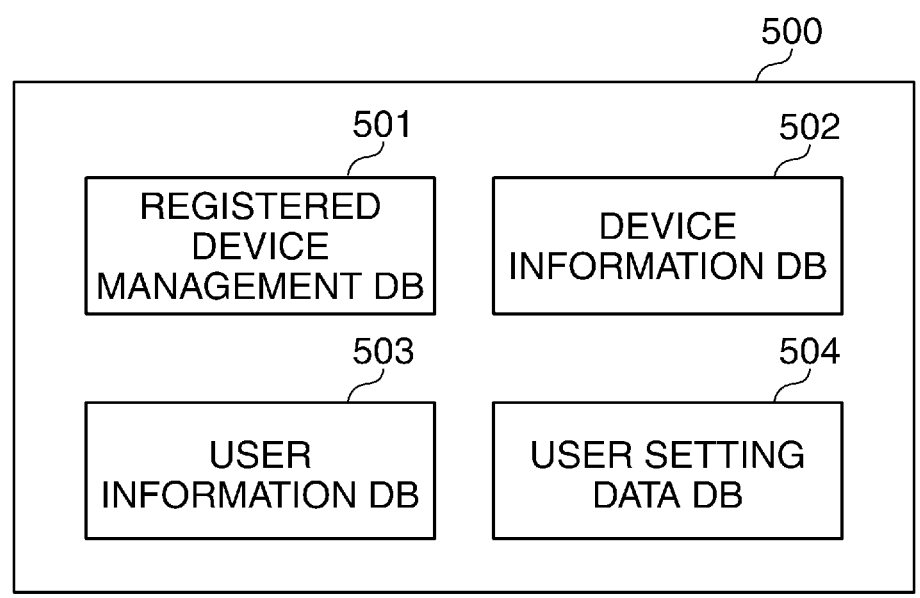
FIG. 5 is a schematic block diagram of master data managed by the server in FIG. 1.

The setting data management module 401 manages the master data 500, shown in FIG. 5, which contains the respective setting data items of the management target apparatuses, and the update date and time information of the setting data items, and updates the setting data items of the management target apparatuses, and the update date and time information of the setting data items. The master data 500 includes a registered device management database (DB) 501, a device information database (DB) 502, a user information database (DB) 503, and a user setting data database (DB) 504. The registered device management database 501 is a database containing identifiers for identifying the management target apparatuses. The device information database 502 is a database for managing device information of each management target apparatus, a correction time indicative of a difference between a server time and a time kept by the management target apparatus, and so forth. In the present embodiment, for example, in a case where the server 101 has received a registration request notification from the MFP 102 for requesting registration of the MFP 102 as a management target apparatus, the server 101 acquires a time kept by the MFP 102 from the received registration request notification. Further, when registering the MFP 102 as a management target apparatus, the server 101 calculates a difference between the server time and the time kept by the MFP 102 using the acquired time, and sets the calculated difference as a correction time to be managed by the device information database 502. With this, the server 101 manages a correction time for each management target apparatus. FIG. 6 shows an example of the device information database 502 managed on a management target apparatus basis.

The user information database 503 is a database for managing user information of users who use the management target apparatuses. For example, as shown in FIG. 7, the user information database 503 contains user IDs and user names of users who use the management target apparatuses.

The user setting data database 504 is a database for managing the setting data items of the management target apparatuses, set on a user-by-user basis. For example, as shown in FIG. 8, the user setting data database 504 contains identifiers for identifying the respective setting data items, and update date and time information of the setting data items.

The communication control module 402 controls each communication for synchronizing the setting data items of the management target apparatuses. The backup management module 403 controls each communication for transmitting the master data 500 to a backup destination which has been set.

Figures 9, 10:
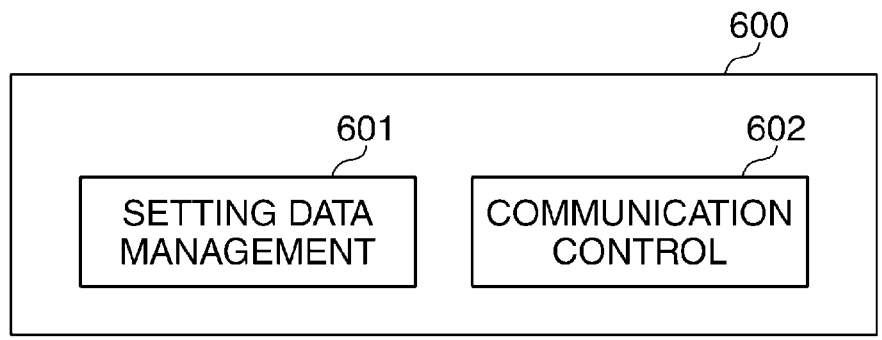
FIG. 9 is a schematic block diagram of software modules of the MFP appearing in FIG. 1.
FIG. 10 is a diagram of an example of contents of setting data.

FIG. 9 is a schematic block diagram of the software modules 600 of the MFP 103 appearing in FIG. 1.

Referring to FIG. 9, the software modules 600 includes a setting data management module 601 and a communication control module 602. Each of the various kinds of processing of the software modules 600 is performed by the CPU 301 of the MFP 102 which executes programs stored in the ROM 303 or the HDD 304.

The setting data management module 601 manages a setting data database, shown in FIG. 10, which contains information on the setting data of the MFP 102.

The communication control module 602 controls each communication for synchronizing the setting data of the MFP 102 stored in the HDD 304. For example, the communication control module 602 periodically transmits a difference acquisition request notification for requesting the acquisition of updated setting data. The difference acquisition request notification is transmitted, for example, depending on a power management state and a job execution state of the MFP 103.

Figure 11:
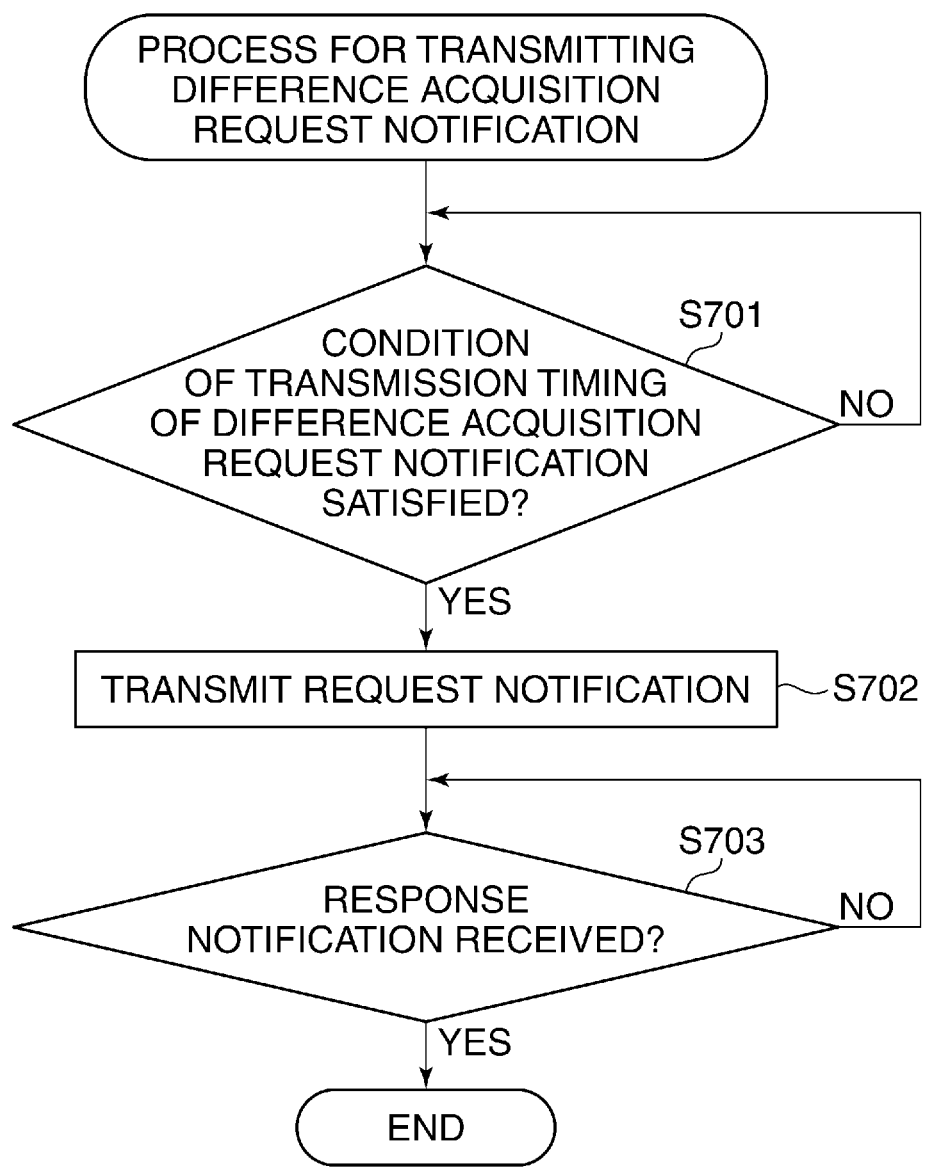
FIG. 11 is a flowchart of a process performed by an MFP, as an alternative management apparatus, appearing in FIG. 1, for transmitting a difference acquisition request notification.

FIG. 11 is a flowchart of a process performed by the MFP 103 appearing in FIG. 1, for transmitting the difference acquisition request notification.

The FIG. 11 process is performed by the CPU 301 which executes programs stored in the ROM 303 or the HDD 304.

Referring to FIG. 11, first, the CPU 301 determines whether or not a preset condition of the transmission timing of the difference acquisition request notification is satisfied (step S701). The difference acquisition request notification is a notification for requesting the acquisition of setting data updated after a predetermined date and time. If the preset condition of the transmission timing of the difference acquisition request notification is satisfied (YES to the step S701), the CPU 301 transmits the difference acquisition request notification to the server 101 as a request notification (step S702). In the present embodiment, not only the difference acquisition request notification but also a registration request notification, an entire-data acquisition request notification, an update request notification, or a device registration request notification, each of which will be described hereinafter, is sometimes transmitted as the request notification. Therefore, the server 101 as the management apparatus or the MFP 102 as an alternative management apparatus, referred to hereinafter, determines contents of the request notifications, as described hereinafter. Further, the difference acquisition request notification as the request notification contains e.g. information indicative of a date and time at which the setting data was acquired from the server 101, as a predetermined date and time. Next, when the CPU 301 acquires a response notification to the request notification from the server 101 (YES to a step S703), the present process is terminated.

Incidentally, in the present embodiment, in a case where a management target apparatus set as a backup destination, e.g. the MFP 102, has server functions, the location of the server authority over the management system 100 is sometimes changed from the server 101 to the MFP 102. In this case, the server 101 transmits the master data 500 and a program for executing the backup management module 403 to the MFP 102 as the alternative management apparatus (hereinafter also referred to as the "alternative server"). When the alternative server receives the master data 500 and the program from the server 101, and the location of the server authority over the management system 100 is changed thereto, similar to the server 101, the alternative server manages the respective setting data items of the MFPs 103 and 104 registered as the management target apparatuses. For example, in a case where the MFP 103 transmits a setting data update request notification to the alternative server, the alternative server updates the setting data of the MFP 103, and records the update date and time of the setting data as update date and time information of the setting data. At this time, an alternative server time kept by the time keeping section 309 of the MFP 102 at the update time of the setting data is recorded as the update date and time information of the setting data. That is, after the change of the location of the server authority to the alternative server, the update date and time information of the setting data is managed using the alternative server time.

Next, a description will be given of a request response process performed by the alternative server, for making a response to an update request transmitted from a management target apparatus.

Figure 12A:
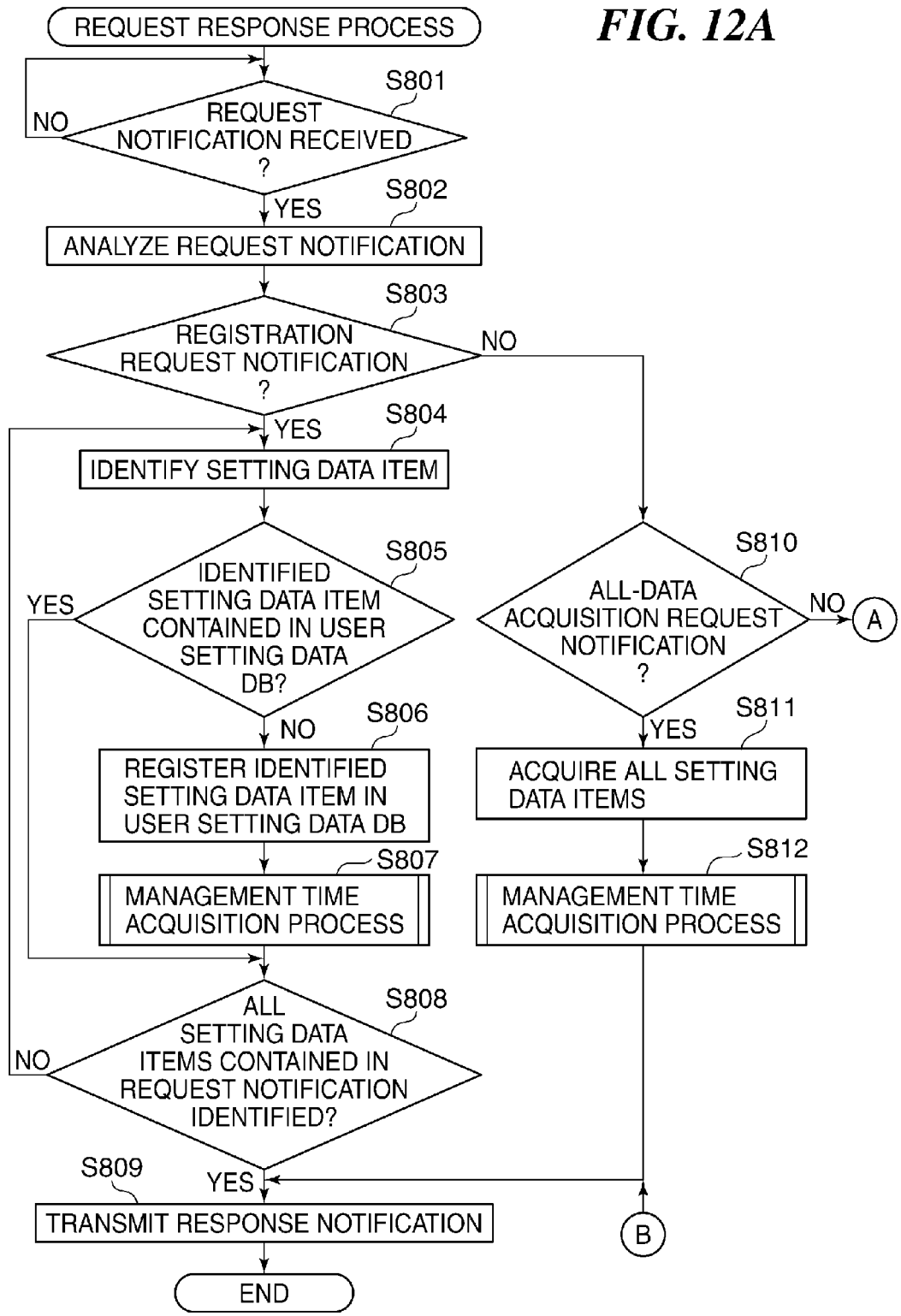
FIG. 12A is a flowchart of a request response process performed by the MFP as the alternative management apparatus.

FIGS. 12A and 12B are a flowchart of the request response process performed by the MFP 102 as the alternative management apparatus.

The process in FIGS. 12A and 12B is performed by the CPU 301 of the MFP 102 which executes programs stored in the ROM 303 or the HDD 304.

Here, in a case where the location of the server authority is changed from the server 101 to the alternative server but the alternative server time does not match the server time, there is a possibility of occurrence of a problem in synchronization of the setting data. Let us assume, for example, a case in which the alternative server time is three hours behind the server time. In this case, when the MFP 103 transmits a setting data update request notification to the alternative server at 11:00 AM of the server time, to update setting data associated with the transmitted update request notification, a conventional alternative server records 8:00 AM as update date and time information of the setting data directly using the alternative server time. That is, the conventional alternative server records 8:00 AM as update date and time information of the setting data updated at 11:00 AM of the server time. After that, even when the MFP 104 sends a request for acquiring setting data updated after 10:00 AM of the server time to the alternative server, the conventional alternative server recognizes that the update date and time information of the setting data updated at 11:00 AM of the server time indicates 8:00 AM. This causes a problem that the conventional alternative server does not transmit the setting data updated at 11:00 AM of the server time to the MFP 104.

To cope with this, in the present embodiment, the alternative server manages a difference between the server time and the alternative server time, corrects the alternative server time using the managed difference, and manages the setting data based on the corrected alternative server time. More specifically, the alternative server uses the corrected alternative server time as the update date and time information of the setting data of the user setting data database 504.

Referring to FIGS. 12A and 12B, first, upon receipt of the request notification from the management target apparatus or an apparatus requesting the registration thereof as a management target apparatus (YES to a step S801), the CPU 301 of the MFP 102 as the alternative management apparatus analyzes the request notification (step S802). Then, the CPU 301 determines whether or not the request notification is a registration request notification which requests registration of new setting data (step S803).

If it is determined in the step S803 that the request notification is a registration request notification, the CPU 301 identifies a setting data item requested to be newly registered, based on the request notification (step S804). Then, the CPU 301 determines whether or not the identified setting data item is contained in the user setting data database 504 (step S805).

If it is determined in the step S805 that the identified setting data item is contained in the user setting data database 504, the CPU 301 executes a step S808, described hereinafter. On the other hand, if it is determined in the step S805 that the identified setting data item is not contained in the user setting data database 504, the CPU 301 registers the identified setting data item in the user setting data database 504 (step S806). Next, the CPU 301 performs a management time acquisition process, described hereinafter with reference to FIG. 13, and acquires a time for managing the user setting data database 504 (hereinafter referred to as a "management time") (step S807). Then, the CPU 301 records the acquired management time as update date and time information of the newly registered setting data item in the user setting data database 504. Then, the CPU 301 determines whether or not all the setting data items contained in the request notification have been identified (step S808).

If it is determined in the step S808 that all the setting data items have not been identified, the CPU 301 returns to the step S804, whereas if it is determined in the step S808 that all the setting data items have been identified, the CPU 301 transmits a response notification including the management time to the sender of the request notification (step S809), followed by terminating the present process.

If it is determined in the step S803 that the request notification is not a registration request notification, the CPU 301 determines whether or not the request notification is an all-data acquisition request notification for requesting the acquisition of all the setting data items registered in the user setting data database 504 (step S810). If it is determined in the step S810 that the request notification is an all-data acquisition request notification, the CPU 301 acquires all the setting data items of the user setting data database 504 (step S811), and performs the management time acquisition process, described hereinafter with reference to FIG. 13, to thereby acquire the management time (step S812). Then, the CPU 301 generates a response notification containing the acquired management time and all the setting data items, and executes the step S809, followed by terminating the present process.

If it is determined in the step S810 that the request notification is not an all-data acquisition request notification, the CPU 301 determines whether or not the request notification is an update request notification for requesting update of setting data items registered in the user setting data database 504 (step S813). If it is determined in the step S813 that the request notification is an update request notification, the CPU 301 identifies a setting data item requested to be updated from the request notification (step S814). Next, the CPU 301 determines whether or not the identified setting data item was changed after being updated in the user setting data database 504 (step S815). More specifically, the CPU 301 determines whether or not a time at which the identified setting data item was changed is later than the immediately preceding update time of the identified setting data item of the user setting data database 504.

If it is determined in the step S815 that the time at which the identified setting data was changed is earlier than the immediately preceding update time of the identified setting data item of the user setting data database 504 (NO to the step S815), the CPU 301 executes a step S818, described hereinafter. On the other hand, if it is determined in the step S815 that the time at which the identified setting data was changed is later than the immediately preceding update time of the identified setting data item of the user setting data database 504 (YES to the step S815), the CPU 301 updates the identified setting data item using the changed setting data (step S816). Next, the CPU 301 performs the management time acquisition process, described hereinafter with reference to FIG. 13, and acquires a management time (step S817). Then, the CPU 301 records the acquired management time as update date and time information of the setting data item updated in the user setting data database 504. Then, the CPU 301 determines whether or not all the setting data items contained in the request notification have been identified (step S818).

If it is determined in the step S818 that all the setting data items have not been identified, the CPU 301 returns to the step S814, whereas if it is determined in the step S818 that all the setting data items have been identified, the CPU 301 executes the step S809, followed by terminating the present process.

If it is determined in the step S813 that the request notification is not an update request notification, the CPU 301 determines whether or not the request notification is a difference acquisition request notification (step S819).

If it is determined in the step S819 that the request notification is a difference acquisition request notification, the CPU 301 acquires setting data associated with the difference acquisition request notification from the user setting data database 504 (step S820). More specifically, the CPU 301 compares a predetermined date and time contained in the difference acquisition request notification and the update date and time information of each of the setting data items in the user setting data database 504, and acquires setting data items which contain update date and time information later than the predetermined date and time. Next, the CPU 301 performs the management time acquisition process, described hereinafter with reference to FIG. 13, and acquires a management time (step S821). Then, the CPU 301 generates a response notification containing the acquired management time and the setting data items acquired according to the difference acquisition request notification, and executes the step S809, followed by terminating the present process. This causes the setting data to be synchronized.

If it is determined in the step S819 that the request notification is not a difference acquisition request notification, the CPU 301 determines whether or not the request notification is a device registration request notification for requesting the registration of a management target apparatus (step S822). If it is determined in the step S822 that the request notification is a device registration request notification, the CPU 301 registers registration information of a new management target apparatus based on the device registration request notification (step S823), and executes the step S809, followed by terminating the present process. On the other hand, if it is determined in the step S822 that the request notification is not a device registration request notification, the CPU 301 determines whether or not the request notification is a device information update request notification for requesting update of the registration information of the management target apparatus (step S824).

If it is determined in the step S824 that the request notification is a device information update request notification, the CPU 301 updates the registration information of the management target apparatus based on the device information update request notification (step S825), and executes the step S809, followed by terminating the present process. On the other hand, if it is determined in the step S824 that the request notification is not a device information update request notification, the CPU 301 determines whether or not the request notification is a request notification concerning other data managed by the alternative server (step S826).

If it is determined in the step S826 that the request notification is a request notification concerning other data, the CPU 301 performs associated processing based on the request notification concerning the other data (step S827), and executes the step S809, followed by terminating the present process. On the other hand, if it is determined in the step S826 that the request notification is not a request notification concerning other data, the CPU 301 generates a response notification of an error (step S828), and executes the step S809, followed by terminating the present process.

Figure 13:
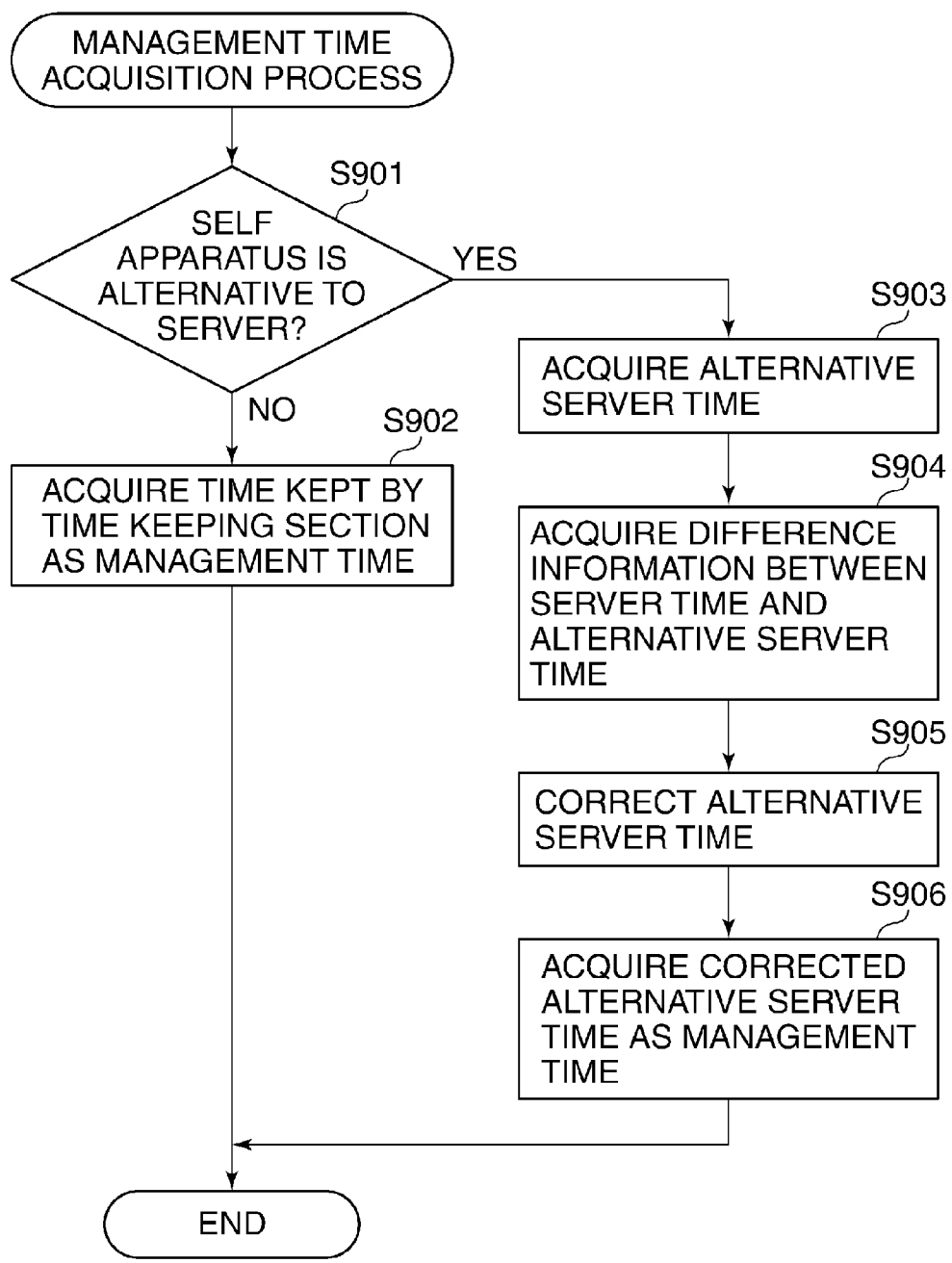
FIG. 13 is a flowchart of a management time acquisition process performed by the MFP as the alternative management apparatus.

FIG. 13 is a flowchart of the management time acquisition process performed by the MFP 102 as the alternative management apparatus.

The management time acquisition process shown in FIG. 13 is performed by the CPU 301 which executes programs stored in the ROM 303 or the HDD 304.

Referring to FIG. 13, first, the CPU 301 determines whether or not the MFP 102 itself is an alternative to the server 101 as the management apparatus (step S901).

If it is determined in the step S901 that the MFP 102 itself is not an alternative to the server 101, the CPU 301 of the MFP 102 acquires a time kept by the time keeping section 309 as the management time (step S902), followed by terminating the present process. On the other hand, if it is determined in the step S901 that the MFP 102 itself is an alternative to the server 101 (alternative server), the CPU 301 acquires a time kept by the time keeping section 309 (alternative server time) (step S903). Then, the CPU 301 acquires difference information between the server time and the alternative server time (step S904). More specifically, the CPU 301 acquires a correction time calculated in advance from the device information database 502 of the MFP 102. The correction time indicates a difference between the server time and the time kept by the time keeping section 309 of the MFP 102, which was calculated when the MFP 102 was registered as a management target apparatus. Then, the CPU 301 corrects the alternative server time using the acquired correction time (step S905), and acquires the corrected alternative server time as the management time (step S906), followed by terminating the present process. Here, the alternative server time corrected by the correction time is a time corrected by correcting the alternative server time using the difference information between the server time and the alternative server time, and is none other than the server time. That is, in the FIG. 13 process, when the MFP 102 itself is the alternative of the server 101, not the alternative server time but the server time is practically acquired as the management time by correction of the alternative server time. Further, the management time is recorded as update date and time information in the user setting data database 504. Therefore, even when the MFP 102 itself becomes the alternative to the server 101, the update date and time information of the setting data items in the user setting data database 504 are in actuality managed by the server time.

According to the above-described processes in FIGS. 12A, 12B, and 13, even when the MFP 102 itself becomes the alternative to the server 101, the update date and time information of the setting data items in the user setting data database 504 is in actuality managed by the server time. With this, upon receipt of the difference acquisition request notification, not the alternative server time but the server time is compared with the predetermined date and time contained in the difference acquisition request notification. This means that it is possible to always generate a response notification to the difference acquisition request notification based on the server time. As a consequence, it is possible to prevent a problem from occurring in synchronizing the setting data.

Although in the above-described embodiment, the description is given of the case where a management target apparatus set as the backup destination of the server 101 is used as an alternative management apparatus, the alternative management apparatus is not limited to a management target apparatus. For example, a server other than the server 101 may be employed as the alternative management apparatus insofar as it has the same configuration as that of the FIG. 2 hardware, and also includes the FIG. 4 software modules 400.

Further, in the above-described embodiment, in the case where the server other than the server 101 is used as the alternative management apparatus, the alternative management apparatus may acquire a notification containing the server time when receiving the master data 500 from the server 101. This makes it possible to eliminate the need of performing data communication with the server 101 only in order to acquire the server time from the server 101. As a consequence, it is possible to prevent communication load on the alternative server from being increased by processing for acquiring the server time.

Further, in the above-described embodiment, the difference between the server time and the alternative server time may be calculated using the server time contained in the acquired notification. This makes it possible to positively acquire the server time, whereby it is possible to positively correct the alternative server time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-037030 filed Feb. 29, 2016 which is hereby incorporated by reference herein in its entirety.

What is claimed is:

1. A management system comprising:
    a management server;
    a client apparatus; and
    a backup server,
    wherein
    the management server includes:
    a memory device that stores a set of instructions; and
    at least one processor that executes the set of instructions to:
        store, in a first storage device, setting information of the client apparatus with a time on a clock of the management server,
    the client apparatus includes:
    a memory device that stores a set of instructions; and
    at least one processor that executes the set of instructions to:
        transmit, to the management server, an update request of setting information stored in the first storage device of the management server, in a case where setting information of the client apparatus is updated; and
    the backup server includes:
    a memory device that stores a set of instructions; and
    at least one processor that executes the set of instructions to:
        receive, from the management server, the setting information stored in the first storage device and the time on the clock of the management server stored in the first storage device;
        store, in a second storage device of the backup server, backup data including the received setting information and the received time on the clock of the management server as an update time;
        manage time difference information between time measured by the management server and time measured by the backup server;
        update, in a case where the backup server works as an alternative management server, the setting information of the backup data, based on an update request received from the client apparatus; and
        store, in the second storage device, in the case where the backup server works as the alternative management server, a time as the update time based on a time on a clock of the backup server and the time difference information.

2. The management system according to claim 1, wherein the management server registers the backup server as a client of the management server.

3. The management system according to claim 1, wherein the backup server is an image processing apparatus that performs image processing.

4. The management system according to claim 1, wherein the management system is configured to change a server authority over the management system from the management server to the backup server.

5. A method of controlling a management system including a management server, a client apparatus, and a backup server, the method comprising:
    storing, in a first storage device of the management server, setting information of the client apparatus with a time on a clock of the management server;
    transmitting, by the client apparatus, to the management server, an update request of setting information stored in the first storage device of the management server, in a case where setting information of the client apparatus is updated;
    receiving, by the backup server, from the management server, the setting information stored in the first storage device and the time on the clock of the management server stored in the first storage device;

storing, in a second storage device of the backup server, backup data including the received setting information and the received time on the clock of the management server as an update time;

managing, by the backup server, time difference information between time measured by the management server and time measured by the backup server;

updating, by the backup server, in a case where the backup server works as an alternative management server, the setting information of the backup data, based on an update request received from the client apparatus; and storing, in the second storage device, in the case where the backup server works as the alternative management server, a time as the update time based on a time on a clock of the backup server and the time difference information.

* * * * *